United States Patent [19]

Beder

[11] 4,304,068

[45] Dec. 8, 1981

[54] COLLAPSIBLE TERRARIUM

[75] Inventor: Samuel L. Beder, South Salem, N.Y.

[73] Assignee: The Diamond Mind, Inc., New York, N.Y.

[21] Appl. No.: 27,166

[22] Filed: Apr. 4, 1979

Related U.S. Application Data

[63] Continuation-in-part of Ser. No. 955,358, Oct. 27, 1978.

[51] Int. Cl.³ .............................................. A01G 9/02
[52] U.S. Cl. ..................................... 47/17; 47/28 A; 47/69; 47/28 R; 135/2; 135/4 R
[58] Field of Search ............... 47/17, 69, 21, 28, 28.1, 47/31, 26; 251/294; 135/2, 4, 4 B, 14 R, 14 D, 15 R, 5 E, 20 B, 21, 25 R

[56] References Cited

U.S. PATENT DOCUMENTS

| | | | |
|---|---|---|---|
| 645,890 | 3/1900 | Conrad | 47/21 |
| 738,588 | 9/1903 | Woodworth | 47/21 |
| 1,092,517 | 4/1914 | Blanchard | 251/294 X |
| 2,752,928 | 7/1956 | Barker | 47/28.1 |
| 2,771,087 | 11/1956 | Simonson | 135/21 X |
| 2,928,405 | 3/1960 | Lawson | 47/26 X |
| 3,110,532 | 11/1963 | Nail | 47/69 X |
| 3,121,975 | 2/1964 | Duhamel | 47/17 |
| 3,206,892 | 9/1965 | Telkes et al. | 47/69 X |
| 3,320,697 | 5/1967 | Larsen | 47/69 |
| 3,889,698 | 6/1975 | Roessl | 47/26 |
| 3,939,607 | 2/1976 | Spector | 47/69 |
| 4,118,890 | 10/1978 | Shore | 47/69 X |
| 4,128,966 | 12/1978 | Spector | 47/69 |
| 4,141,798 | 2/1979 | Grosse | 47/17 |

FOREIGN PATENT DOCUMENTS

| | | | |
|---|---|---|---|
| 544647 | 2/1932 | Fed. Rep. of Germany | 47/21 |
| 2150357 | 12/1972 | Fed. Rep. of Germany | 135/2 |
| 2381499 | 10/1978 | France | 47/31 |
| 1232635 | 5/1971 | United Kingdom | 47/26 |

*Primary Examiner*—James R. Feyrer
*Attorney, Agent, or Firm*—Bertram Frank

[57] ABSTRACT

A collapsible terrarium to be used for maintaining a controlled environment around potted plants and similar objects includes a flexible fluid-impermeable enclosure which has a bottom portion and a top portion, and a support structure which supports the top portion on and upwardly of the bottom portion to bound a compartment therewith. The support structure is collapsible and with it also the enclosure. The enclosure has an access opening through which potted plants can be introduced into and withdrawn from the compartment bounded by the enclosure. The opening is fluid-tightly closeable and, when closed, no fluid interchange takes place between the compartment and the exterior of the enclosure. An aperture, preferably with a one-way valve in it, is provided in the top portion of the enclosure and flowable media, such as herbicides, insecticides or similar agents can be introduced therethrough into the compartment to act on the plants accommodated therein.

20 Claims, 13 Drawing Figures

COLLAPSIBLE TERRARIUM

CROSS-REFERENCE TO RELATED APPLICATIONS

This is a continuation-in-part application of an application Ser. No. 955,358, filed on Oct. 27, 1978.

BACKGROUND OF THE INVENTION

The present invention relates to terrariums in general, and more particularly to such terrariums which can be used for accommodating potted plants, boxes with seedlings and similar objects therein.

It is well known that, under certain circumstances, it is desired or necessary to keep plants, and sometimes even potted plants, in a controlled environment. Thus, for instance, some plants require for their proper growth and even survival to be surrounded by air which has either a very high or a very low moisture content. Thus, such plants, when grown outside of their natural habitat, are usually kept in controlled-climate structures, such as hot houses, especially when the natural climate at the location where the particular plant is being grown is, as a rule, less humid and/or less warm than what is required by the respective plant. Of course, a hot house is a rather expensive installation in terms of construction costs as well as operating expenses so that the erection and maintenance of such a structure is economically sound only on a commercial basis.

On the other hand, there is also known the currently spreading practice of keeping plants in terrariums of different sizes and shapes. While these terrariums protect, at least to some extent, the plants accommodated therein from adverse environmental influences, they are usually very bulky, difficult to handle, and assume—even at times when they are not being used for growing plants therein—a considerable amount of space, which may be at a premium. Also, such conventional terrariums do not offer protection from all adverse effects of the environment, particularly of the ambient air.

It has also been established that, when plants, even those which do not have to be surrounded by highly humid air, are left unattended and especially without watering, for an extended period of time, the moisture content of the soil surrounding the roots of the plants will become depleted due to the evaporation of water from the leaves into the ambient atmosphere. Thus, for instance, when the owner of the plant leaves for a vacation or a business trip, he or she has to make provisions for someone else to periodically water the plants. This may become very cumbersome and inconvenient both for the owner and for the person entrusted with the care for the plants since, on the one hand, it entails the need to give the caretaker access to the premises where the plant is being kept and, on the other hand, the person doing a favor to the owner may be unduly burdened by making periodic visits to the premises. To alleviate these problems, there have already been developed automatic watering devices; however, it has been established that these devices, which may be quite expensive, are not yet fully reliable and leave much to be desired in other respects too.

Another problem encountered in the past was that, under certain circumstances, the plants may become diseased or be attacked by injurious insects, larvae, fungi or the like. Under these circumstances, it is usually necessary to treat the affected plants with chemicals which, in many instances, may be harmful to the person treating the plants. Such chemicals may then linger in the ambient air, in some instances, even for days, thus increasing the danger of harmful effects on the people breathing the air surrounding the plant. Heretofore, it was impossible or very difficult to avoid the above-mentioned problems.

SUMMARY OF THE INVENTION

Accordingly, it is a general object of the present invention to avoid the disadvantages of the above-discussed prior art.

More particularly, it is an object of the present invention to provide a modified terrarium which is not possessed of the disadvantages of the prior-art terrariums.

A further object of the present invention is to so construct the terrarium as to be able to control the environment of potted plants and similar objects, especially its moisture contents and/or concentration of chemicals therein.

Still another object of the present invention is to so design the arrangement here under consideration as to be collapsible for storage purposes.

A concomitant object of the present invention is to develop an arrangement of the above-mentioned type which is simple in construction, inexpensive to manufacture, easy to use, and reliable nevertheless.

In pursuance of these objects and others which will become apparent hereafter, one feature of the present invention resides in an arrangement for maintaining a controlled environment around potted plants and similar objects which, briefly stated, comprises a flexible enclosure of a material that is substantially impermeable to water and water vapor, the enclosure having an access opening and including a bottom portion and a top portion; means for so supporting the top portion on and upwardly of the bottom portion that these portions together bound a compartment accessible through the access opening for accommodating the respective object or objects therein; and means for closing the access opening to mutually separate and substantially avoid fluid interchange between the compartment and the exterior of the enclosure. By providing the closing means, it is possible to achieve a situation where, for instance, the moisture content of the air contained in the compartment is much higher than that encountered around the enclosure. In fact, the moisture content of the air inside the enclosure may reach the saturation level at a given temperature so that no further moisture will evaporate from the plants and thus the water contained in the pot for use by the plant will be preserved for an extended period of time and thus be available when the plant needs more water. On the other hand, when the temperature drops, at least a part of the moisture content of the air contained in the enclosure will precipitate on the plant itself, or on the soil contained in the pot so that the supply of water in the pot will be at least partially replenished. Thus, plants accommodated in this controlled-environment enclosure will be capable of prospering without watering for much longer periods of time than if left at the same location but surrounded by the ambient air. Thus, the above-discussed inconveniences attending obtaining a caretaker for the plants for an extended period of absence are avoided.

A particularly advantageous construction of the arrangement of the present invention is obtained when the material of the enclosure is light-pervious. Under these circumstances, the plants will not be deprived of natural or artificial light which is needed for the photosynthesis in which the plant engages. It is particularly advantageous when the material of the enclosure is transparent, especially a transparent synthetic plastic material, inasmuch as this allows for a visual observation of the plants even without opening the access opening. This is particularly advantageous when the arrangement is used for accommodating, for instance, tropical plants which need to be maintained in a highly humid air at all times. Under these circumstances, the arrangement of the present invention can be used as a permanent home for the plant, while the transparency of the enclosure will render it possible to fully display the plant and utilize the decorative value thereof.

According to a currently preferred aspect of the present invention, the material of the enclosure is heat-sealable and the top and bottom portions of the enclosure include respective border zones which are heat-sealed to one another. The arrangement which is constructed in this manner is very simple and, hence, inexpensive. In the alternative, the enclosure may be bag-shaped, having an open end which constitutes the access opening. Under these circumstances, it is advantageous for the closing means to include a clamping element which embraces the enclosure at the open end and which presses the same into a sealing contact in the clamping position thereof. This alternative embodiment of the present invention is even less costly than the above-mentioned one.

In accordance with a further aspect of the present invention, the enclosure further includes marginal zones which are located adjacent one another, at least when the top portion is supported on the supporting means, and bounding the access opening. Then, the closing means advantageously includes a plurality of interlocking connecting elements extending along the marginal portions and engaging one another in respective closed positions thereof. It is further advantageous in this respect when the connecting elements are of the slide-fastener type, and when the closing means further includes a slide mounted on the adjacent marginal zones for movement along the same for engaging the connecting elements with and disengaging the same from one another. This type of closing means is very simple and inexpensive, while being also capable of properly exercising the sealing function expected of the same.

It is also contemplated by the present invention for the adjacent marginal portions to extend along a straight line. Under these circumstances, the adjacent marginal portions bounding the access opening can be spread apart by relying on the inherent flexibility of the material of the enclosure when it is desired to introduce a plant into or remove the same from the compartment bounded by the closure. However, it has been found advantageous to so situate the marginal zones that the course thereof will deviate from a single straight line. So, for instance, the marginal zones can extend along a curved course so that the section of the enclosure which has the convex marginal portion thereon can be flipped over, thus enlarging the access opening without the need for stretching the material of the enclosure. However, it has been found to be especially advantageous when the marginal zones are so arranged on the top portion of the enclosure as to give the access opening the configuration of a substantially L-shaped slot. When this construction is resorted to, all of the advantages of, but none of the structural or functional difficulties encountered in connection with, the curved course of the slot constituting the access opening are obtained.

A particularly advantageous embodiment of the present invention is obtained when the support means includes a collapsible support structure. A particular advantage of this construction is that the arrangement can be collapsed for storage purposes, and will assume only a minimum amount of storage space when in its collapsed position. Preferably, the support structure includes a mounting member and a plurality of support members mounted on the mounting member for displacement between support and collapsed positions thereof and contacting the top portion of the enclosure in the support positions thereof. A particularly advantageous embodiment of this concept is obtained when the mounting member is elongated and has a foot portion which rests on the bottom portion of the enclosure at least when the support members assume the support positions thereof. Instead of, or in addition to, this expedient, each of the support members may also have an elongated configuration and may include a base portion which contacts the bottom portion of the enclosure at least in the support position thereof. Thus, the support structure is supported on the bottom portion of the enclosure in one or both of the above-mentioned manners, thus keeping the top portion of the enclosure in its desired position with respect to the bottom portion.

A particularly advantageous embodiment is obtained when there is provided means for displacing the support members between the positions thereof, and when the displacing means includes an actuating member movable toward and away from the mounting member, a plurality of bracing elements each articulated to the actuating member and to one of the support members, and means for holding the actuating member at least in that position thereof in which the bracing elements hold the support members in the support positions thereof. The mounting member may be elongated and the actuating member mounted thereon for longitudinal sliding, thus being guided in the course of its movement. In the alternative, the mounting member, which is affixed to the top portion of the enclosure at least under these circumstances, may have a passage therethrough which communicates the compartment with the exterior of the enclosure. Then, the displacing means includes an elongated displacing element attached to the actuating member and passing through the passage of the mounting member from the compartment to the exterior of the enclosure. Especially when, in accordance with the invention, the displacing element is flexible, it is provided with a gripping part which has a diameter exceeding that of the passage to avoid accidental full retraction of the displacing element into the compartment. It is also contemplated by the invention to equip the actuating member with an elongated extension which is introducible into and receivable in the passage for guiding the actuating member therein during its approach of the mounting member. Then, a sealing element may be mounted on the elongated extension of the actuating member, this sealing element being operative for sealingly closing the passage of the mounting member when the extension is fully received in the passage.

It is also advantageous when the mounting member, whether elongated or not, has a plurality of peripherally arranged openings therein, and when each of the support members has an end portion which is received in one of the openings in the support position thereof. In both of these instances, it is useful when the support members are resiliently flexible, so that they can bend in conformity with the desired shape of the enclosure.

The arrangement discussed so far is very useful for keeping the plant or plants in a closed-system environment, that is, without interchange with the environment of the arrangement as far as gases, vapors, liquids or solids are concerned. Thus, for instance, water vapor will not be permitted to leave the compartment or undesired amounts of water will not be able to reach the plant if the arrangement of the present invention is used for keeping the plant in a controlled environment in the open, that is, outside the premises, with the possibility of moisture precipitation. Also, this enclosure may be used to avoid undesirable pollination of the blooms of the plant. However, as explained above, there may be instances in which it is desired to treat the plant with chemicals, such as insecticides, herbicides or similar agents. When this is desired, it would be possible to at least partially open the access opening and introduce the agents through the access opening. However, according to a further facet of the present invention, it is proposed to provide means for defining an aperture in the enclosure for introducing the above-mentioned agents or other flowable media into the compartment. When this expedient is resorted to, it is further advantageous to accommodate a one-way valve in the aperture and to admit the flowable media through this valve into the compartment. A particular advantage of this expedient is that, when not being used for introducing the flowable media therethrough, the one-way valve prevents any communication between the compartment and the exterior of the enclosure, thus satisfying the above-discussed closed-system concept.

The invention accordingly consists in the features of construction, combination of elements, and arrangement of parts which will be exemplified in the arrangement hereinafter described and of which the scope of application will be indicated in the appended claims.

BRIEF DESCRIPTION OF THE DRAWINGS

In the accompanying drawings in which several of the various possible embodiments of the invention are shown.

DETAILED DISCUSSION OF THE PREFERRED EMBODIMENTS

Figure 1:
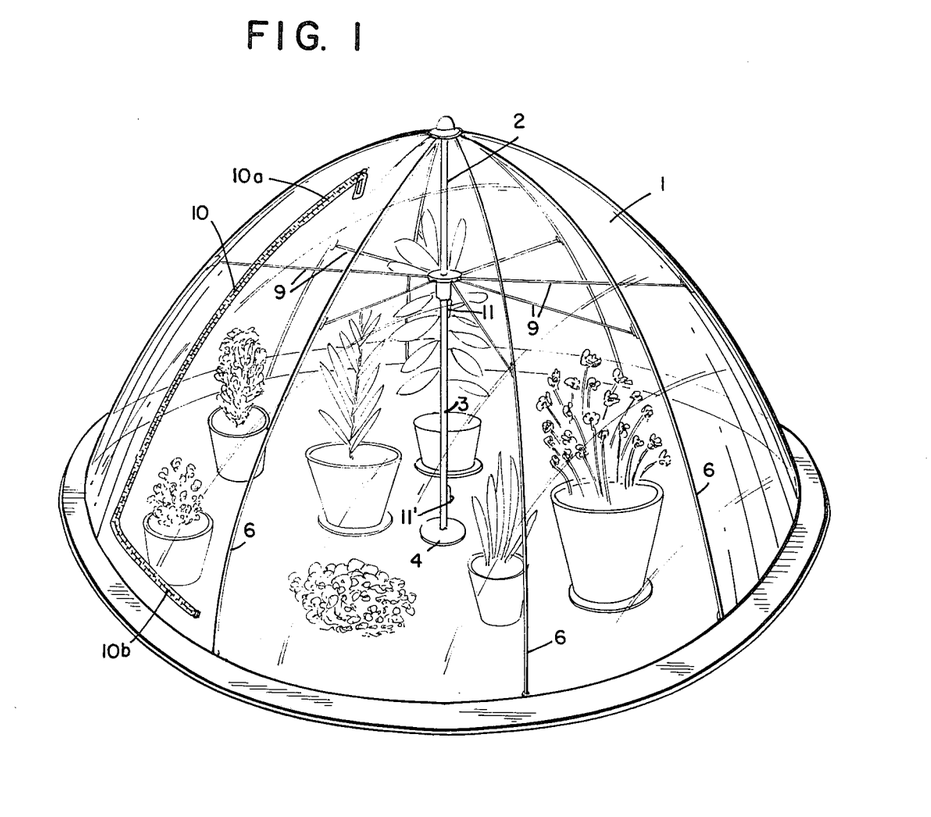
FIG. 1 is a perspective view of an arrangement according to the present invention in its extended position.

Referring now to the drawing in detail, and first to FIG. 1 thereof, it may be seen therein that the arrangement of the present invention, which is also being referred to as a terrarium, includes an enclosure 1 and a support structure 2 which supports the enclosure 1 in its illustrated extended position in which, as also illustrated in FIG. 1, potted plants, boxed seedlings, or similar objects are accommodated in a compartment bounded by the enclosure 1. While the support structure 2 could be located at the exterior of the enclosure 1, the latter being affixed thereto in any conventional manner, it is currently preferred for the support structure 2 to be located in the compartment and to support the enclosure 1 from within.

As also illustrated in FIG. 1, the enclosure has an opening, particularly a slot-shaped opening which, in the illustrated condition, is closed by a closure 10 of the slide-fastener type. The construction of the closure 10 itself is conventional and thus need not be illustrated or described in any detail. However, it is to be mentioned that the closure 10 can also have a construction different from the one illustrated, for instance, it could include interengaging ridges and grooves extending longitudinally of the slot, snap-button connectors distributed along the slot or the like. As also seen, the closure 10 may extend in conformity with the configuration of the slot along a course which is not located in a single plane. So, for instance, the closure 10 and with it also the slot, could be curved not only in conformity with the curvature of the enclosure, but also transversely thereof or, as illustrated, the closure 10 could have two or more sections 10a, 10b enclosing an angle with each other and merging with one another. As illustrated, the sections 10a and 10b of the closure 10, generally speaking, assume such positions with respect to one another as to form a letter L in space.

Figure 2:
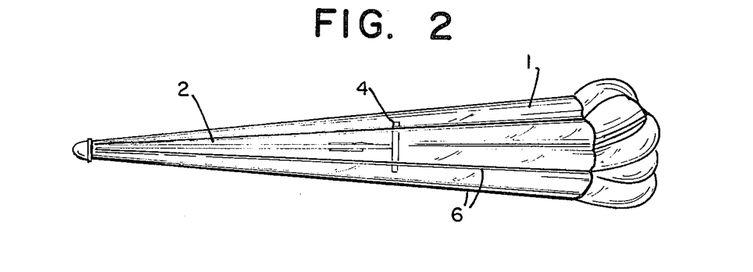
FIG. 2 is a side elevational view of the arrangement of FIG. 1 in its collapsed position.

The support structure 2 is preferably collapsible, for instance, in a manner resembling that of an umbrella frame. The arrangement of FIG. 1 of the present invention is shown in FIG. 2 in its collapsed position.

Figures 3, 4, 5:
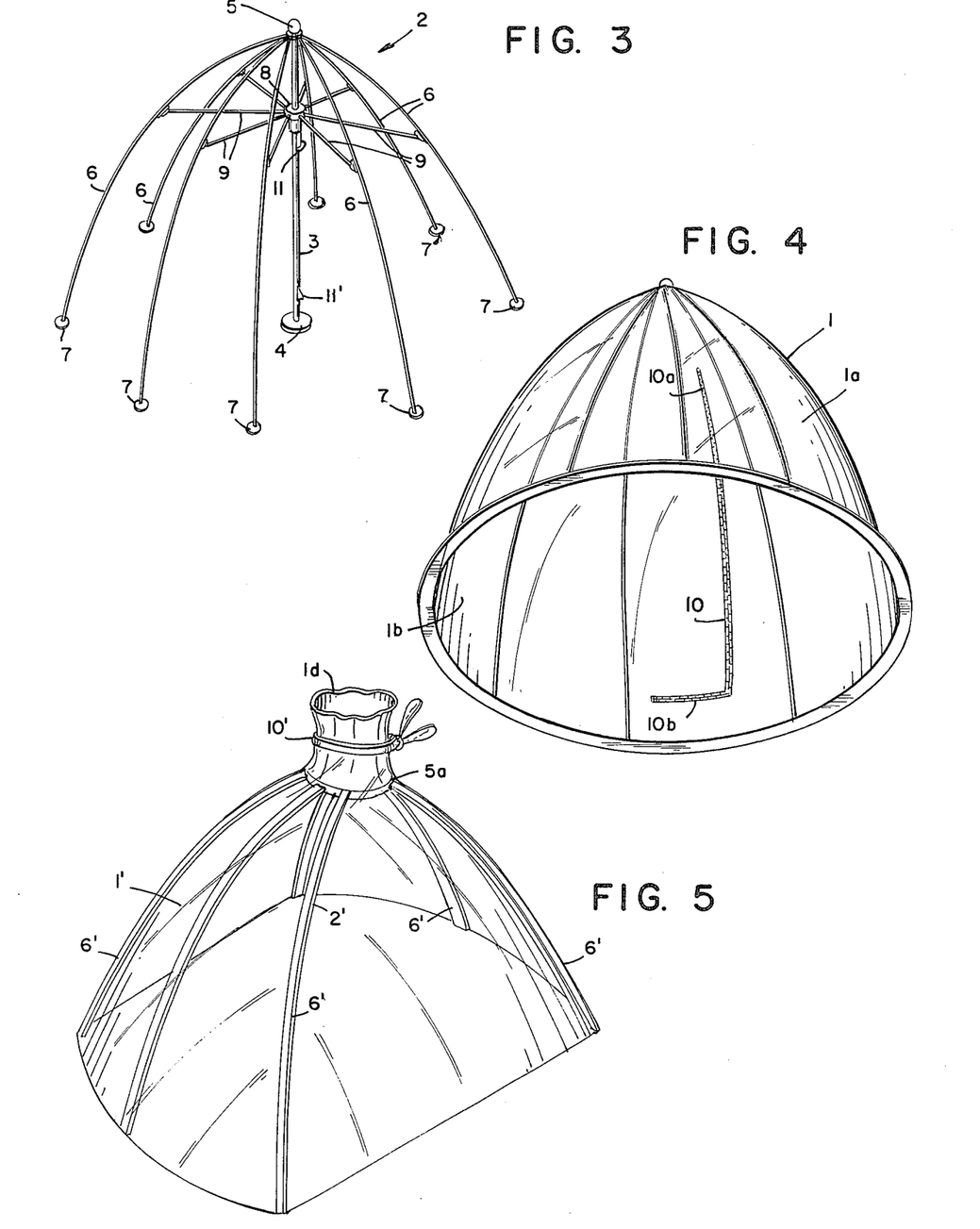
FIG. 3 is a perspective view of a support structure of the arrangement of FIG. 1.
FIG. 4 is a perspective view from below of a modified enclosure which can be used in the arrangement of FIG. 1.
FIG. 5 is a perspective view of a modified arrangement according to the invention.

Referring now to FIG. 3, it may be seen that it illustrates the support structure 2 of FIG. 1 in more detail. As illustrated therein, the support structure 2 includes an elongated mounting member 3 which is provided with or mounted on a foot 4. The mounting member 3 has an end portion 5 on which there is pivotally mounted a plurality of support members 6 each having a base portion 7. An actuating element 8 is mounted on the mounting member 3 for sliding longitudinally of the same, and a plurality of bracing elements 9 is articulated to the actuating element 8 and each to one of the support members 6. An arresting member 11, which is mounted on the mounting member 3 in a conventional manner and retractable against a force of a spring into the interior thereof, forms an obstruction in the trajectory of movement of the actuating element 8 along the mounting member 3 and hence arrests the support structure 2 in its illustrated extended position. A similar arresting member 11' can also be provided at the lower end of the mounting member 3, being operative for arresting the support structure 2 in its collapsed position corresponding to FIG. 2. Of course, the actuating element 8 could be equipped with the arresting member 11 instead, and this arresting member 11 would then cooperate with depressions or slots in the mounting member 3.

Returning now to FIG. 1, it may be seen therein that the enclosure 1 is so supported on the support structure 2 as to be substantially taut. The enclosure 1 is advantageously made of a flexible material such as a synthetic plastic material, for instance polyethylene, which, because of its elasticity, will assume such a spatial configuration as predetermined by the number, shape and distribution of the support members 6. Advantageously, the support members 6 are resiliently yieldable, at least to some extent, so that they will exert a pressure from the inside on the enclosure 1, thus maintaining the latter in a taut condition. This is true whether or not the support members 6 extend all the way to the bottom of the enclosure 1.

FIG. 4 illustrates the enclosure 1 by itself, but in its condition corresponding to that assumed when the enclosure 1 is supported by the support structure 2, as seen from the side and from below. As seen in this Figure, the enclosure 1 includes a top portion 1a and a bottom portion or floor 1b which are sealingly connected to one another at a heat-sealed juncture 1c. It will be appreciated that the top portion 1a and bottom or floor portion 1b form the one-piece enclosure 1 and that said bottom or floor portion is flexible in nature so that it may readily assume a folded or similar configuration as shown in FIG. 2. It may also be seen that the top portion 1a, as well as the bottom portion 1b, are transparent; however, the bottom portion 1b could be light-impervious and the top portion 1a could be translucent rather than transparent. It is also possible and contemplated that even the top portion 1a could be light-impervious, for instance, if it were intended to use the arrangement for growing mushrooms in the compartment bounded by the enclosure 1 or to keep any other objects in darkness for whatsoever reason. A particular advantage obtained when at least the top portion 1a is transparent is that the plants or objects kept in the enclosure 1 are visible through the enclosure 1 and thus being displayed.

A modified arrangement according to the present invention is illustrated in FIG. 5, wherein the enclosure, designated at 1', is a bag of clear synthetic plastic material, such as polyethylene. In this arrangement the enclosure 1' has an open end 1d through which the plants or similar objects and a modified support structure 2' can be introduced into the interior of the enclosure 1'. A closing element 10' such as a string, a protected wire or the like is also provided and, when tied around the enclosure 1' at the open end 1d, it will press the respective adjacent surfaces of the open end 1d of the enclosure 1' against one another to thereby interrupt communication between the interior and the exterior of the enclosure 1'.

Figures 6, 7, 8, 9, 10:
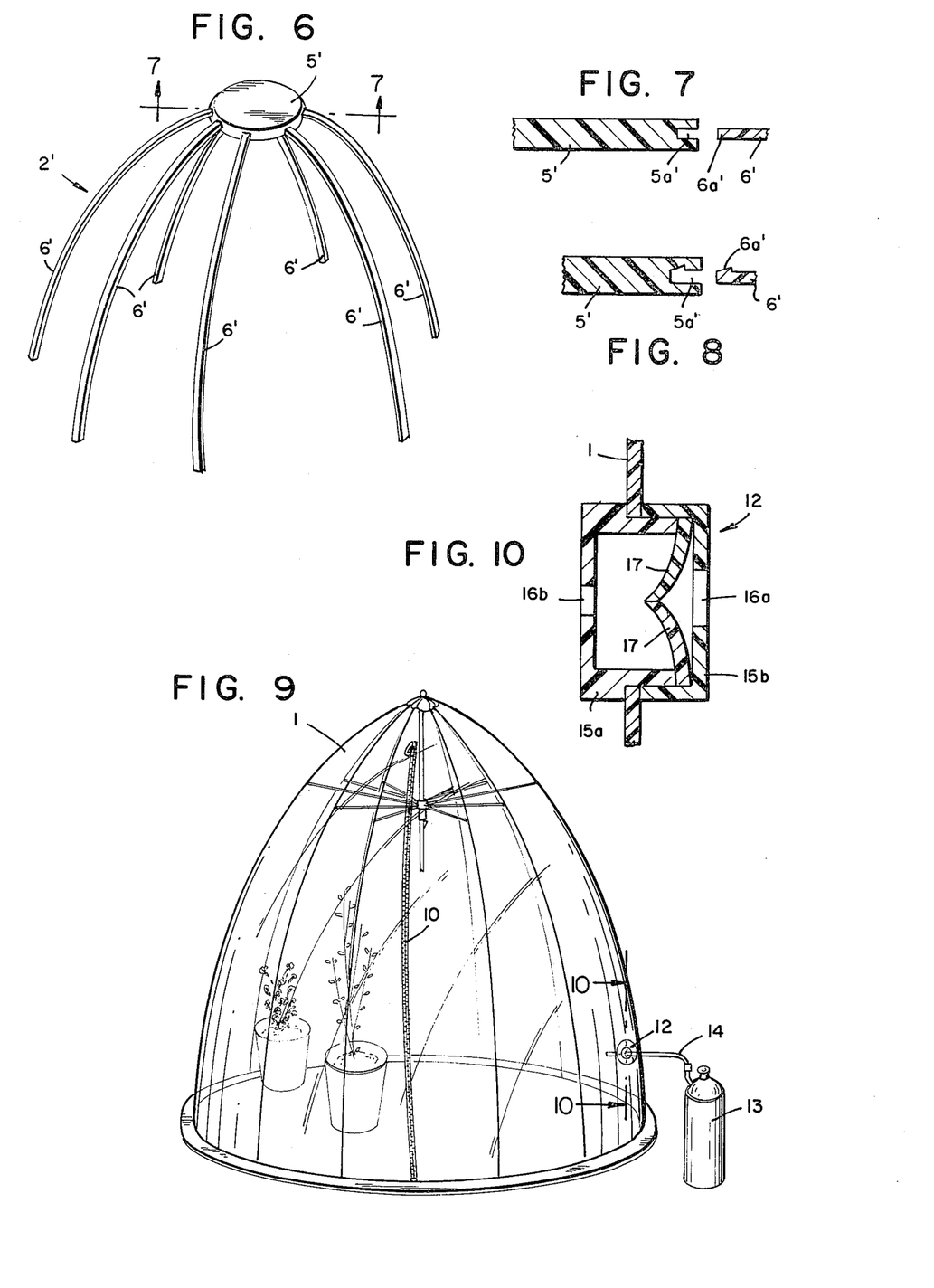
FIG. 6 is a perspective view of a support structure used in the modified arrangement of FIG. 5.
FIG. 7 is a view taken on line VII—VII of FIG. 6 illustrating one possibility of mounting the support elements on a mounting element of the arrangement.
FIG. 8 is a view similar to FIG. 7 but showing another possibility.
FIG. 9 is a view similar to FIG. 1 of an arrangement of the present invention equipped for introduction of flowable media into its internal compartment.
FIG. 10 is a sectional view taken on line X—X of FIG. 9.

The support structure 2' is illustrated by itself in FIG. 6. As seen therein, the support structure 2' has a mounting member 5' advantageously of a thermoplastic or thermosetting synthetic plastic material, from which there extend support members 6' which may be either curved, as illustrated, or resilient to the extent necessary for assuming the position illustrated in FIGS. 5 and 6.

The support members 6' can either be of one piece with the mounting member 5', or separate therefrom. In the latter instance, the mounting member 5' may have peripherally distributed openings 5a', and respective end portions 6a' of the support member 6' could be received therein and held by friction, as illustrated in FIG. 7. On the other hand, as illustrated in FIG. 8, the recesses 5a' could have undercut configurations, and the support members 6' could have projections 6a'' engaging in the recesses 5a'', for instance with snap-action. In this manner, the support members 6' are prevented from accidentally disassociating themselves from the mounting member 5'.

FIG. 9 illustrates the enclosure 1 in its extended position, and also shows that the enclosure 1 can be provided with an aperture accommodating a one-way valve 12. Of course, the valve 12 could be omitted from the aperture in the event that the latter is small enough so as not to permit any substantial amounts of air to flow therethrough. The one-way valve 12 serves the purpose of introducing flowable media, such as insecticide or herbicide sprays or the like, into the internal compartment of the enclosure 1. These chemicals can be contained in a container, such as a spray can 13 and can be sprayed directly into and through the valve 12. However, it is advantageous when the spray can 13 is equipped with an injector 14 which can then be passed through the valve 12 and into the interior of the enclosure 1.

The valve 12 can be of any conventional construction, such as that used in footballs. An exemplary embodiment of a one-way valve 12 which could be used in this arrangement is illustrated in FIG. 10. As seen therein, the valve 12 includes a housing consisting of two parts 15a and 15b which are press-fittingly mounted on one another and which confine the enclosure 1 between themselves in a sealing fashion. Each of the housing parts 15a and 15b is provided with a respective orifice 16a and 16b through which the interior of the housing 15, 15b communicates with the interior and the exterior of the enclosure 1, respectively.

The housing parts 15a and 15b also clamp between themselves a plurality of resilient lips 17 which sealingly contact each other centrally of the housing 15a, 15b in the illustratated closed position of the valve 12. Should, however, pressure at the right side of the lips 17 exceed that of at the left side, such as when pressurized flowable media are introduced into the housing 15a, 15b through the orifice 16a, the lips 17 will part and permit the particular medium to reach the orifice 16b and pass therethrough into the internal compartment bounded by the enclosure 1. Of course, when the spray can 13 is equipped with the injector 14, the latter will spread the lips 17 apart during its insertion into and passage through the orifices 16a and 16b of the valve 12. In both instances, there is obtained the advantage that the chemicals and similar substances are safely introduced into the compartment of the enclosure 1, that is, without escaping to the exterior of the enclosure 1. Once inside, the chemicals may linger in the air contained in the compartment for hours or even days without endangering the environment of the arrangement, provided that the enclosure 10 remains closed.

Figure 11:
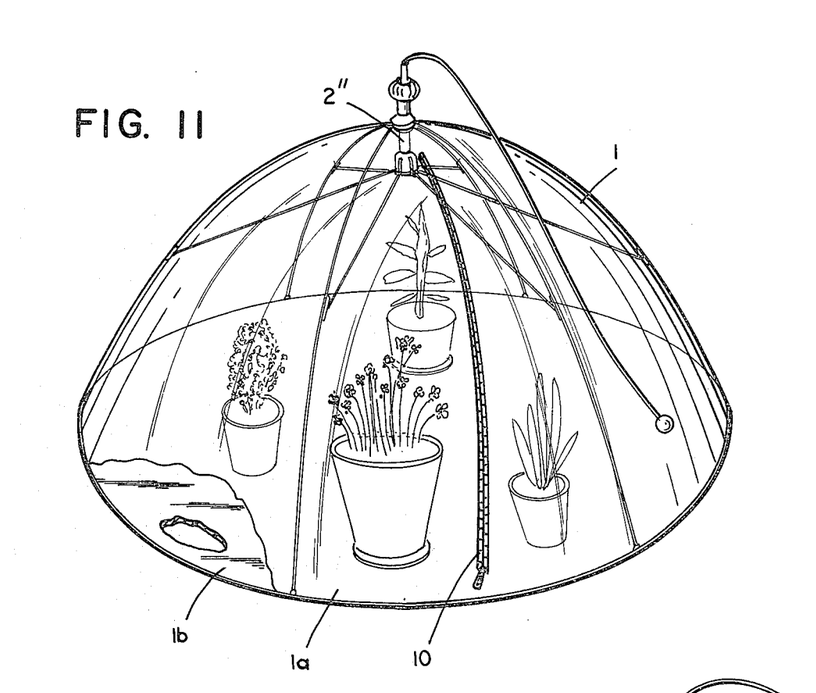
FIG. 11 is a view similar to FIG. 1 but of an arrangement having a modified support structure.

FIG. 11 illustrates the arrangement having the same enclosure 1 as illustrated in FIG. 1, but a modified support structure 2''. As may be seen particularly well in FIG. 12, the support structure 2'' includes a modified mounting member 3'' to which the support members 6 are pivotally connected, and a modified actuating element 8'' which has the bracing elements 9 connected thereto. Details of the support structure 2" are shown in FIG. 13. The actuating element 8" includes an actuating portion 18 that is provided with slots 19 for receiving the end portions of the bracing elements 9. A wire or a similar element 20 passes through the end portions of the bracing elements 9 and is bent around the lower end of the actuating portion 18, preferably received in a circumferential groove thereof. The grooves 19 receive the end portions of the bracing elements 9 in the collapsed position of the support structure 2". The actuating element 8" further has a guiding portion 21, which is delimited at its lower end by an abutment collar 22.

The mounting member 3" has a passage 23 therein, and a flexible element 24, such as a string, passes therethrough to the exterior of the enclosure 1 in the manner illustrated in particular in FIG. 11. The string 24 is connected to the actuating element 8" and is capable of pulling the same upwardly until the guiding portion 21 is received and guided in the passage 23 toward the abutment of the collar 22 with the mounting member 3". The string 24 has a gripping element, here having a spherical configuration, at its free end, the diameter of the element 25 exceeding that of the passage 23 for preventing the string 24 from being accidentally fully withdrawn into the interior of the enclosure 1.

Figure 12:
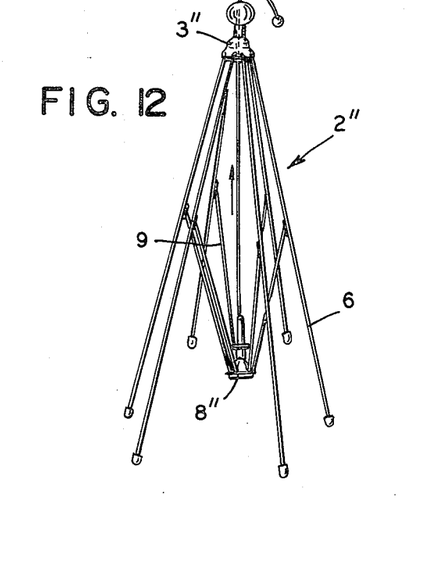
FIG. 12 is a perspective view of the support structure of the arrangement of FIG. 11 in a partially collapsed condition.
Figure 13:
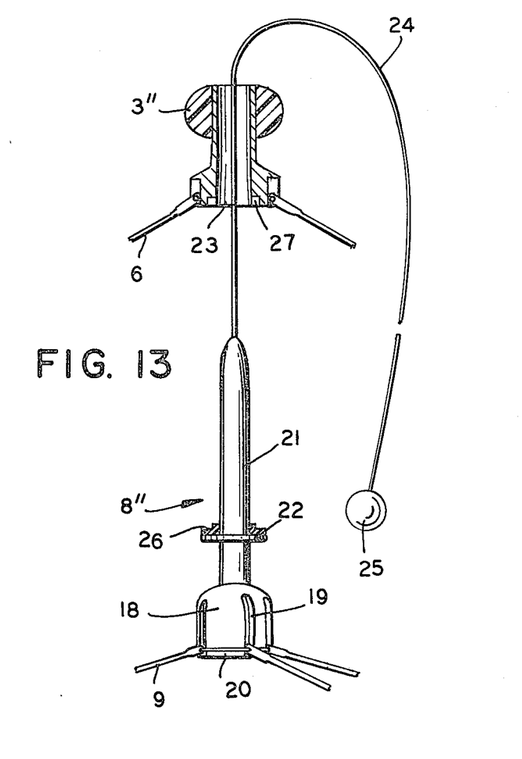
FIG. 13 is a partly sectioned view of a fragment of the support structure of FIG. 12.

It will be appreciated that, when the support structure is to be moved from the collapsed position illustrated in FIG. 12 into its extended position shown in FIG. 11, the string 24 or the gripping portion 25 thereof are to be pulled outwardly relative to the enclosure 1, as a result of which the actuating element 8" will be displaced toward the mounting member 3". During the final stages of the approach, the guiding portion 21 will enter the passage 23 and be guided therein until further movement is prevented by the abutment of the collar 22 with the mounting member 3". The structure 2" is kept in its extended position until it is desired to collapse the arrangement for storage or transportation purposes. At this time, the guiding portion 21 is pushed from the exterior of the enclosure 1 (compare FIG. 11) to the interior thereof until the bracing elements 9 pass their dead-center positions. At this time, outward pressure on the enclosure 1 will be sufficient for fully withdrawing the actuating element 8" and collapsing the support elements 6 and bracing elements 9.

FIG. 13 also shows that a bushing or a similar sealing element 26 may be mounted on the extension 21 at the collar 22. The sealing element 26 may either be a flat ring or, as illustrated, it may have a stepped configuration. Then, the passage 23 may be enlarged, as indicated at 27, to receive the smaller diameter portion of the sealing element 26. In this manner, fluids are prevented from entering or leaving the interior of the enclosure 1 through the passage 23.

It may be seen from the above explanation that the enclosure of the present invention is suited for many uses. However, an important feature of the arrangement of the present invention is that it keeps the plants or similar objects in a controlled environment by separating the compartment in which the objects are accommodated from the ambient air, be it to keep the humidity of air inside the compartment high, or to confine vaporous or gaseous chemicals or other substances inside, or to protect the blooms of the plants from undesired pollution, or for any other similar purposes.

The arrangement of the present invention is presently contemplated for preferred use on the premises, that is, in residences, business locations, offices, or the like. Nevertheless, it is also contemplated to use the arrangement in backyards, gardens, on patios or the like. However, when used in this manner, care should be taken that the arrangement not be exposed to intense sunrays since the same and/or the attendant greenhouse effect of the arrangement could damage or destroy either the plants or the arrangement itself.

As various possible embodiments might be made of the above invention, and many changes might be made in the embodiments set forth above, it is to be understood that all matter herein described or shown in the accompanying drawings is to be interpreted as illustrative only and not in a limiting sense. Thus, it will be understood by those skilled in the art that, although preferred and alternative embodiments have been shown and described, the invention is not limited thereto or thereby. Rather, the scope of protection afforded will be determined exclusively with reference to the following claims.

I claim:

1. A collapsible, terrarium for maintaining a controlled environment around house and garden plants, comprising a flexible substantially sealed enclosure of a material that is substantially impermeable to water and water vapor, having a closable access opening and including a floor portion and a top portion; a collapsible support structure having a mounting member and a plurality of support members mounted on the mounting member for displacement between support and collapsed positions thereof, and contacting the top portion of the enclosure in the support position thereof to support the top portion in and upwardly of the floor of flexible material so that the portions together bound a compartment accessible through the access opening for accommodating the plant therein, means for closing the access opening to mutually separate, and substantially avoid fluid interchange between the compartment and the exterior of the enclosure, and means to actuate said support structure whereby said flexible enclosure is converted from the support position by a single movement of said actuation means.

2. An arrangement as defined in claim 1, wherein said material of said enclosure is light-pervious.

3. An arrangement as defined in claim 2, wherein said material is a transparent synthetic plastic material.

4. An arrangement as defined in claim 1, wherein said material of said enclosure is heat-sealable; and wherein said top and bottom portions of said enclosure include respective border zones that are heat-sealed to one another.

5. An arrangement as defined in claim 1, wherein said enclosure is bag-shaped and has an open end constituting said access opening; and wherein said closing means includes a clamping element embracing said enclosure at said open end and pressing the same into a sealing contact in a clamping position thereof.

6. An arrangement as defined in claim 4, wherein said enclosure further includes marginal zones located adjacent one another at least when said top portion is supported on said supporting means, and bounding said access opening; and wherein said closing means includes a plurality of interlocking connecting elements extending along said marginal portions and engaging one another in respective closed positions thereof.

7. An arrangement as defined in claim 6, wherein said connecting elements are of the slide-fastener type; and wherein said closing means further includes a slide mounted on said adjacent marginal zones for movement along the same for engaging said connecting elements with and disengaging the same from one another.

8. An arrangement as defined in claim 6, wherein said marginal zones are so arranged on said top portion of said enclosure as to give said access opening the configuration of a substantially L-shaped slot.

9. An arrangement as defined in claim 1, wherein said mounting member is elongated and has a foot portion resting on said bottom portion of said enclosure at least when said support members assume said support positions thereof.

10. An arrangement as defined in claim 1, wherein said support members are elongated and each includes a base portion contacting said bottom portion of said enclosure at least in said support positions of said support members.

11. An arrangement as defined in claim 1; and further comprising means for displacing said support members between said positions thereof, wherein said actuating means is an actuating member movable toward and away from said mounting member, a plurality of bracing elements each articulated to said actuating member and to one of said support members, and means for holding said actuating member at least in that position thereof in which said bracing elements hold said support members in said support positions thereof.

12. An arrangement as defined in claim 11, wherein said mounting member is elongated and said actuating member is mounted thereon for longitudinal sliding.

13. An arrangement as defined in claim 11, wherein said mounting member is affixed to said top portion of said enclosure and has a passage therethrough communicating said compartment with said exterior; and wherein said displacing means includes an elongated flexible displacing element attached to said actuating member and passing through said passage to said exterior.

14. An arrangement as defined in claim 13, wherein said displacing element has a gripping part having a diameter exceeding that of said passage.

15. An arrangement as defined in claim 13, wherein said actuating member has an elongated extension receivable in said passage for guidance therein as said actuating member approaches said mounting member.

16. An arrangement as defined in claim 15; and further comprising a sealing element mounted on said elongated extension of said actuating member and sealingly closing said passage of said mounting member when said extension is fully received in said passage.

17. An arrangement as defined in claim 1, wherein said mounting member has a plurality of peripherally arranged openings therein; and wherein each of said support members has an end portion received in one of said openings in said support position thereof.

18. An arrangement as defined in claim 1, wherein said support members are resiliently flexible.

19. The arrangement as defined in claim 1, and further comprising means defining an aperture in said enclosure for introducing flowable media into said compartment in its supported position.

20. An arrangement as defined in claim 18; and further comprising a one-way valve accommodated in said aperture and operative for introducing flowable media therethrough into said compartment and for preventing escape of flowable media therethrough to said exterior.

* * * * *